April 15, 1958 M. W. WOLFE 2,830,641
TUBELESS TIRE VALVE
Filed July 20, 1954
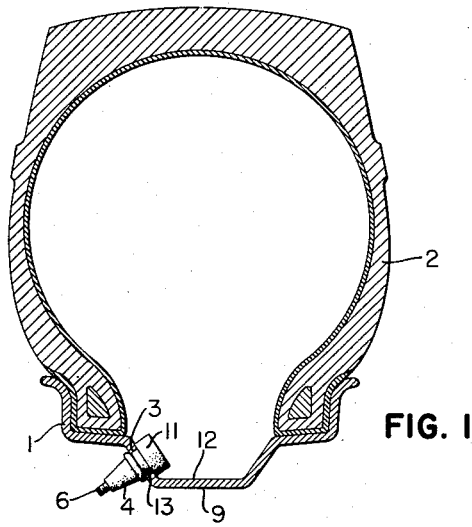
FIG. 1
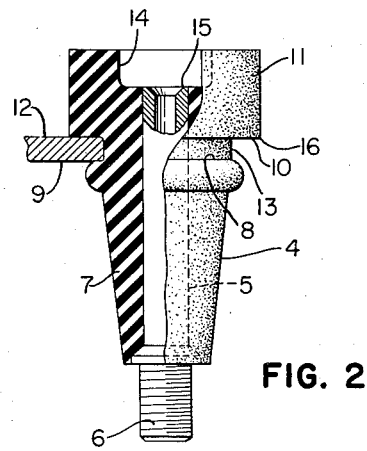
FIG. 2
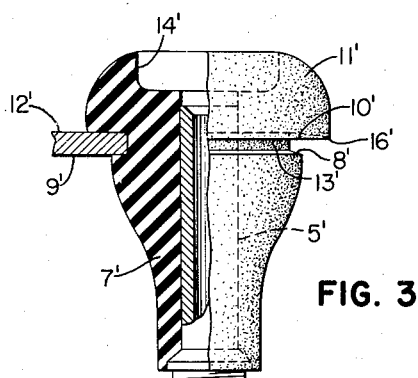
FIG. 3
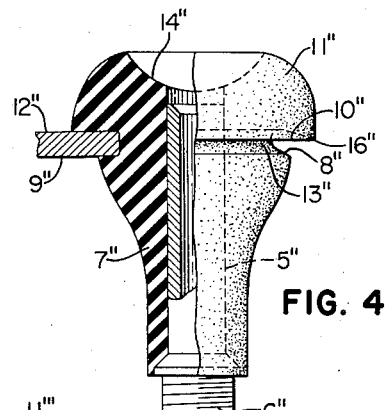
FIG. 4
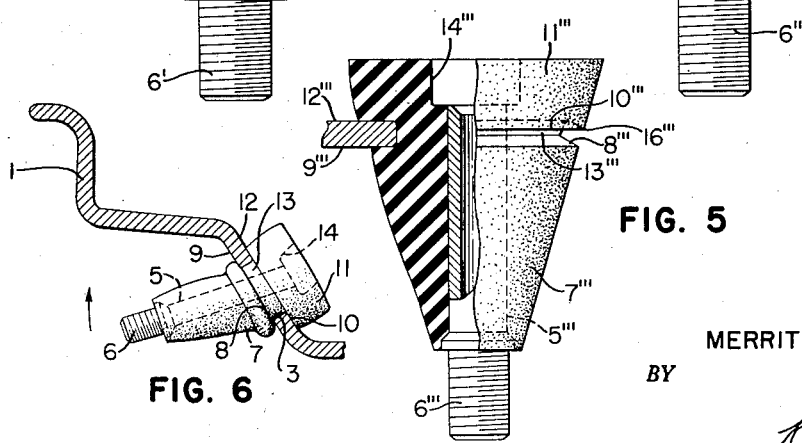
FIG. 5
FIG. 6
INVENTOR.
MERRITT W. WOLFE
BY
ATTORNEY

United States Patent Office 2,830,641
Patented Apr. 15, 1958

2,830,641

TUBELESS TIRE VALVE

Merritt W. Wolfe, Akron, Ohio, assignor to The Goodyear Tire & Rubber Company, Akron, Ohio, a corporation of Ohio Application July 20, 1954, Serial No. 444,509

10 Claims. (Cl. 152—427)

This invention relates to a rubber valve stem and particularly to a rubber valve stem for use with a tubeless tire and rim assembly.

It is an object of the present invention to provide a rubber valve stem which is easily affixed to and removable from a rim for use with tubeless tires.

Another object of the invention is to provide a self-sealing and self-retaining rubber valve stem for use with a tubeless tire and rim assembly.

Another object of the invention is to provide a rubber valve stem of the type described which retains a seal against the leakage of air through the rim hole under the various forces exerted during operation, particularly centrifugal, axial, vibrational and bending forces.

For a better understanding of the invention reference may be made to the accompanying drawings in which:

Fig. 1 is a cross-sectional view taken longitudinally through the tire, rim, and valve stem embodying the present invention;

Fig. 2 is an elevational view of the valve stem embodying the present invention with parts broken away to show in cross-section the valve stem in operative engagement with the rim;

Fig. 3 is a cross-sectional view similar to Fig. 2 of another form of the invention;

Fig. 4 is a cross-sectional view similar to Fig. 2 of another form of the invention;

Fig. 5 is a cross-sectional view similar to Fig. 2 of another form of the invention;

Fig. 6 is a partial cross-section of the valve stem shown in Fig. 1 mounted on a rim and flexed in a direction shown by the arrow.

Referring to Fig. 1 of the drawing the numeral 1 indicates a tire rim upon which is mounted a tubeless tire 2. The rim 1 is provided with a valve hole 3 of standard dimensions through which the valve stem, generally indicated by the numeral 4, projects. The stem 4 is provided with an axial bore having a metal valve tube 5 disposed therein and bonded to the stem 4 for a substantial portion of its length. The upper end of the tube 5 projects above the stem 4 and is provided with threads 6 adapted to retain a conventional valve cap.

The valve stem 4 has a barrel portion 7 which gradually tapers and terminates in a shoulder 8. In operating position the shoulder 8 bears against the inner surface 9 of the rim adjacent the valve hole and the flange 10 of the base 11 bears against the outer surface 12 of the rim adjacent the valve hole. The neck 13 of the valve stem 4 bears against the inner periphery of the rim valve hole 3. The base flange 10 is considerably larger in diameter than the barrel 7 or shoulder 8 of the stem so that considerably more area of the outer rim surface 7 adjacent the valve hole is contacted by the flange 10 than by the shoulder 8. The base 11 is also relatively thick, preferably 4 to 6 times thicker than the thickness of the rim or axial length of the neck portion 13 of the stem. The base is provided with a circular recess 14 which terminates in a plane substantially below the plane of the neck portion 13 and has a rectangular cross-sectional configuration.

In order to provide a seal between the neck portion 13 of the stem and the periphery of the valve rim hole, the neck portion has an outside diameter between 18 and 40% larger than the diameter of the valve rim hole 3 and preferably approximately 22% larger. The axial length of the neck 13 is conversely made considerably shorter than the thickness of the rim 1 so that the flange 10 and shoulder 8 are compressed against the inner and outer surfaces 9 and 12 of the rim adjacent the valve rim hole.

It is, thus, seen that the inner periphery of the hole 3 and the inner and outer rim surfaces 9 and 12 adjacent the hole 3 are respectively sealed by compression of the neck 13, the shoulder 8 and the flange 10. As shown in cross-section in Fig. 2, the neck 13 of the stem is in a plane which intersects the tube 5 so that the neck 13 is highly compressed, when in operative position, between the valve insert or tube 5 and the inner periphery of the valve hole 3. The shoulder 8 and the flange 10 likewise are compressed against the inner and outer rim surfaces 9 and 12 adjacent the valve rim hole to thereby seal the hole against the leakage of air and provide a positive stop to locate the valve during the mounting operation and hold the valve normal to the rim surfaces.

The flange 10 further functions to prevent the stem from being pulled out manually, thrown out by centrifugal force or forced out by air pressure through the valve rim hole 3. The shoulder 8, in addition to sealing the inner rim periphery 9 adjacent the valve rim hole prevents the valve from being forced axially through the valve rim hole during the inflation operation.

The recess 14 has a diameter considerably larger than the diameter of the valve insert or tube 5 but smaller than the diameter of neck portion 13 and, as noted above, the recess terminates in a plane substantailly below the plane of the rim and preferably in the plane of the end 15 of the tube 5. The recess 14 functions to increase the flexibility of the base 11 to maintain the seal on the inner and outer surfaces of the rim during extreme flexing of the valve. Should the valve tube 5 be subjected to a flexing force, or pushed transversely in a direction shown by the arrow in Fig. 6, the tube 5 pivots about an axis within the plane of the rim. The end of the tube 5 acts to transmit the force to the flange 10 thereby increasing the compression and sealing action thereof in a direction opposite to that in which the force is applied. In like manner, the compression of the shoulder 8 is increased in the direction of the applied flexing force. During any radial flexing of the stem. the sealing pressure of the neck portion 13 between the tube 5 and the periphery of the valve rim hole 3 is retained because the pivot axis is within the plane of the rim 1.

Referring to Fig. 3 of the drawings, the barrel 7' of the stem 4' is flared outwardly and terminates at the shoulder 8'. The base 11' is rounded or dome-shaped in cross-section and the flange 10' of the base 11' extends radially outwardly at an acute angle to a radial plane so that additional compressive force is exerted at the outer edge 16' of the flange 10'. The base recess 14' is circular in plan view and substantially rectangular in cross-sectional view. The diameter of the recess 14' is less than the diameter of the neck 13' but greater than the diameter of the tube 5'.

In Fig. 4 a further modification of the present invention is shown in which the base recess 14'' and the neck portion 13'' have arcuate configurations in cross-section.

In the modification of the present invention, shown in Fig. 5, the barrel portion 7''' and the base 11 extend longitudinally to form a conical surface. The flange 10''' and shoulder 8''' are formed by an annular groove extending radially into the stem at an acute angle to a radial plane. The diameter of the base 11''' thereby increases in proportion to the axial distance from the flange 10'''.

The valve stem is easily applied to the rim 1 by manually inserting the barrel portion 7 into the valve hole 3 from the outer side 12 toward the inner side 9 of the rim 1 until the wider portion of the barrel 7 engages the periphery of the valve hole. A blow or axial force is then applied to the base 11 to force the barrel 7 and shoulder 8 through the hole 3 and seat the neck 13, shoulder 8 and flange 10 in and around the valve rim hole.

While certain representative embodiments and details have been shown for the purpose of illustrating the invention, it will be apparent to those skilled in this art that various changes and modifications may be made therein without departing from the spirit or scope of the invention.

I claim:

1. A valve stem adapted to be attached to a rim for use with tubeless tires comprising, a metal valve tube and a rubber stem bonded to a valve tube, said stem having a neck portion in a plane which intersects said valve tube for engagement with the valve opening in the tire rim, said neck portion having a diameter 18 to 40% larger than the diameter of the valve opening in the rim, a base portion having a diameter which increases in direct ratio to the distance from the neck portion to form a conical-shaped base having a minimum diameter substantially larger than the neck portion, a barrel portion decreasing in diameter in direct ratio to the distance from the neck portion to form a conical-shaped barrel having a maximum diameter less than the minimum diameter of the base and a recess in the bottom of the base having a maximum diameter greater than the diameter of the valve tube.

2. A valve stem for a tubeless tire rim comprising a metal valve tube bonded to a rubber stem, said stem having a cylindrical neck portion for engagement with the valve opening in the rim, said neck portion being in a plane which intersects the tube and having a diameter in its unstressed condition 18 to 40% greater than the diameter of said rim opening, a base larger in diameter than the neck portion and having a surface for engagement with the outer surface of the rim adjacent the valve opening, and a recess in the bottom of the base communicating with said metal valve tube, said recess having a maximum diameter greater than said valve tube but less than the diameter of said neck portion.

3. A valve stem as claimed in claim 2 having an annular shoulder projecting from the stem for engagement with the inner surface of the rim adjacent the rim valve opening.

4. A valve stem as claimed in claim 2 in which the cross section of said recess taken parallel to the longitudinal axis of the valve is rectilinear.

5. A valve stem as claimed in claim 2 in which the base surface for engagement with the outer surface of the rim extends radially at an acute angle to a radial plane of the stem.

6. A valve as claimed in claim 3 in which the base surface and shoulder for engaging respectively the outer and inner surfaces of the rim extend at an acute angle to a radial plane of the valve stem.

7. A valve stem as claimed in claim 5 in which the cross section of said recess taken parallel to the longitudinal axis of the valve stem is rectilinear.

8. A valve stem for a tubeless tire rim comprising a metal valve tube bonded to a rubber stem having a cylindrical neck portion for engagement with an opening in the wheel rim, said neck portion having a diameter in its unstressed condition 18 to 40% greater than the diameter of said rim opening, a base having a flange for engagement with the outer surface of the rim, said rim-engaging flange extending at an acute angle to a radial plane of the stem, the outer surface of said base having a maximum diameter located adjacent to the radially outer extremity of said rim-engaging flange, and a recess in the bottom surface of said base having a maximum diameter greater than the metal valve tube but less than said neck portion.

9. A valve as claimed in claim 8 in which the outer surface of said base decreases in diameter from the said maximum diameter to a minimum diameter located at said base surface.

10. A valve as claimed in claim 8 in which the outer surface of said base in cross section curves radially inwardly from the said maximum diameter toward the axis of said valve.

References Cited in the file of this patent

UNITED STATES PATENTS

| | | |
|---|---|---|
| 2,038,473 | Bronson | Apr. 21, 1936 |
| 2,225,472 | Franklin | Dec. 17, 1940 |
| 2,272,886 | Wilson | Feb. 10, 1942 |
| 2,308,952 | Ickes | Jan. 19, 1943 |
| 2,634,785 | Tubbs | Apr. 14, 1953 |
| 2,769,476 | Herzegh et al. | Nov. 6, 1956 |